United States Patent
Kim et al.

(10) Patent No.: US 9,148,883 B2
(45) Date of Patent: *Sep. 29, 2015

(54) METHOD OF RECEIVING DATA FROM BASE STATION AT RELAY NODE IN WIRELESS COMMUNICATION SYSTEM AND APPARATUS THEREOF

(71) Applicant: LG Electronics Inc., Seoul (KR)

(72) Inventors: Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/518,822

(22) Filed: Oct. 20, 2014

(65) Prior Publication Data

US 2015/0036585 A1 Feb. 5, 2015

Related U.S. Application Data

(63) Continuation of application No. 13/696,045, filed as application No. PCT/KR2011/003670 on May 18, 2011, now Pat. No. 8,923,304.

(60) Provisional application No. 61/405,237, filed on Oct. 21, 2010, provisional application No. 61/405,625, filed on Oct. 21, 2012.

(30) Foreign Application Priority Data

Mar. 25, 2011 (KR) .................. 10-2011-0026760

(51) Int. Cl.
*H04L 12/54* (2013.01)
*H04W 72/04* (2009.01)
(Continued)

(52) U.S. Cl.
CPC ............... *H04W 72/042* (2013.01); *H04B 7/14* (2013.01); *H04B 7/15528* (2013.01); *H04B 7/15542* (2013.01); *H04L 5/0023* (2013.01); *H04L 5/0051* (2013.01)

(58) Field of Classification Search
CPC .................. H04L 5/0023; H04B 7/15528
See application file for complete search history.

(56) References Cited

U.S. PATENT DOCUMENTS 8,380,213 B2 2/2013 Cai et al.
8,400,906 B2 3/2013 Lee et al.
(Continued)

FOREIGN PATENT DOCUMENTS

CN 101868033 A 10/2010
CN 102625978 A 8/2012
(Continued)

OTHER PUBLICATIONS

Huawei, "DCI for Rel-10 Downlink MIMO," 3GPP TSG RAN WG1, Meeting #62, Agenda Item 6.3.4, R1-104506, Aug. 23-27, 2010, Madrid, Spain, 7 pages.

(Continued)

*Primary Examiner* — Kevin Mew
(74) *Attorney, Agent, or Firm* — Birch, Stewart, Kolasch & Birch, LLP

(57) ABSTRACT

A method is described for transmitting a physical downlink shared channel (PDSCH) to a relay node at a base station in a multiple antenna wireless communication system. The method includes modulating a relay-node-specific physical downlink control channel (R-PDCCH) based on a relay-node-specific reference signal, and transmitting the R-PDCCH and the PDSCH to the relay node. If the R-PDCCH is modulated based on the relay-node-specific reference signal and carries a specific downlink control information, the PDSCH is encoded based on a predetermined antenna port and a predetermined scrambling identifier (SCID).

26 Claims, 13 Drawing Sheets

(51) Int. Cl.
*H04B 7/155* (2006.01)
*H04L 5/00* (2006.01)
*H04B 7/14* (2006.01)

(56) References Cited

U.S. PATENT DOCUMENTS

| | | | |
|---|---|---|---|
| 8,547,896 B2 | 10/2013 | Park et al. | |
| 8,599,740 B2 | 12/2013 | Cai et al. | |
| 8,644,210 B2 | 2/2014 | Chung et al. | |
| 8,724,648 B2 | 5/2014 | Zeng et al. | |
| 8,831,119 B2* | 9/2014 | Kang et al. | 375/260 |
| 9,031,052 B2* | 5/2015 | Chung et al. | 370/344 |
| 2010/0111018 A1 | 5/2010 | Chang | |
| 2010/0232285 A1 | 9/2010 | Lee et al. | |
| 2010/0232346 A1 | 9/2010 | Yu et al. | |
| 2010/0238845 A1 | 9/2010 | Love et al. | |
| 2011/0038302 A1* | 2/2011 | Papasakellariou et al. | 370/315 |
| 2011/0090808 A1 | 4/2011 | Chen et al. | |
| 2011/0103295 A1 | 5/2011 | Khandekar et al. | |
| 2011/0149886 A1 | 6/2011 | Xu et al. | |
| 2011/0164577 A1 | 7/2011 | Cai et al. | |
| 2011/0176477 A1 | 7/2011 | Lee et al. | |
| 2011/0243066 A1* | 10/2011 | Nayeb Nazar et al. | 370/328 |
| 2011/0268064 A1 | 11/2011 | Chen et al. | |
| 2011/0317780 A1* | 12/2011 | Kang et al. | 375/260 |
| 2012/0039283 A1 | 2/2012 | Chen et al. | |
| 2012/0155561 A1 | 6/2012 | Seo et al. | |
| 2012/0188937 A1 | 7/2012 | Wang et al. | |
| 2012/0207084 A1 | 8/2012 | Seo et al. | |
| 2012/0218964 A1 | 8/2012 | Park et al. | |
| 2012/0300741 A1* | 11/2012 | Han et al. | 370/329 |
| 2012/0320880 A1* | 12/2012 | Han et al. | 370/335 |
| 2013/0034070 A1* | 2/2013 | Seo et al. | 370/329 |
| 2013/0044712 A1 | 2/2013 | Kim et al. | |

FOREIGN PATENT DOCUMENTS

| | | |
|---|---|---|
| EP | 2 562 943 A2 | 2/2013 |
| JP | 2012-512613 A | 5/2012 |
| JP | 2012-520620 A | 9/2012 |
| WO | WO 2011/021852 A2 | 2/2011 |
| WO | WO 2011/049401 A2 | 4/2011 |

OTHER PUBLICATIONS

NEC Group, "eNB Transmission Modes for Type 1 Relay Node," TSG-RAN WG1#62bis, Agenda Item 6.6.5, R1-105421, Oct. 11-15, 2010, Xian, China, 5 pages.

Panasonic. "DCI: Formats for R-PDCCH", 3GPP TSG RAN WG1 Meeting #61bis, Agenda Item 6.6.1, R1-103776, Dresden, Germany, Jun. 28-Jul. 2, 2010, 3 pages.

Panasonic, "DM-RS for R-PDCCH and R-PDSCH," 3GPP TSG-RAN WG1 Meeting 59, Agenda Item 7.8.1.6, R1-094515, Nov. 9-13, 2009, Jeju, Korea, 3 pages.

Qualcomm Incorporated, "DM-RS for R-PDCCH," 3GPP TSG-RAN WG1 #60bis, Agenda Item 6.6.1.2, R1-102345, Apr. 12-16, 2010, Beijing, China, 5 pages.

Qualcomm Incorporated, "R-PDCCH Design," 3GPP TSG-RAN WG1 #60bis, Agenda Item 6.6.1.2, R1-102344, Apr. 12-16, 2010, Beijing, China, 7 pages.

* cited by examiner

— Prior Art —

(a) Control-Plane Protocol Stack (b) User-Plane Protocol Stack

METHOD OF RECEIVING DATA FROM BASE STATION AT RELAY NODE IN WIRELESS COMMUNICATION SYSTEM AND APPARATUS THEREOF

CROSS-REFERENCE TO RELATED APPLICATIONS

This application is a continuation of co-pending U.S. patent application Ser. No. 13/696,045 filed on Nov. 2, 2012, which is the National Phase of PCT/KR2011/003670 filed on May 18, 2011, which claims priority under 35 U.S.C. 119(e) to U.S. Provisional Application Nos. 61/405,237 and 61/405,625, both filed on Oct. 21, 2010, and under 35 U.S.C. 119(a) to Patent Application No. 10-2011-0026760 filed in the Republic of Korea on Mar. 25, 2011. The contents of all of these applications are hereby incorporated by reference as fully set forth herein in their entirety.

BACKGROUND OF THE INVENTION

1. Field of the Invention

The present invention relates to a wireless communication system. And, more particularly, the present invention relates to a method of receiving data from a base station at a relay node in a wireless communication system and apparatus thereof.

2. Discussion of the Related Art

As an example of a wireless communication system to which the present invention may be applied, a 3GPP LTE (3rd Generation Partnership Project Long Term Evolution; hereinafter referred to as "LTE") communication system will now be broadly described.

FIG. 1 illustrates a general view of an E-UMTS network structure as an example of a wireless communication system. Herein, the E-UMTS (Evolved Universal Mobile Telecommunications System) corresponds to a system evolved from the conventional UMTS (Universal Mobile Telecommunications System). The 3GPP is presently carrying out a basic standardization process for the E-UMTS. Generally, the E-UMTS may also be referred to as an LTE system. For details of the technical specifications of the UMTS and the E-UMTS, reference may be made to Release 7 and Release 8 of "3rd Generation Partnership Project; Technical Specification Group Radio Access Network".

Referring to FIG. 1, the E-UMTS includes a User Equipment (UE) (120), base stations (eNode B; eNB) 110*a* and 110*b*, and an Access Gateway (AG), which is located at an end of a network (E-UTRAN) and connected to an external network. The base stations can simultaneously transmit multiple data streams for a broadcast service, a multicast service and/or a unicast service.

One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits Downlink (DL) scheduling information of downlink data to the corresponding user equipment to notify information related to time and frequency domains to which data will be transmitted, encoding, data size, and HARQ (Hybrid Automatic Repeat and reQuest). Also, the base station transmits Uplink (UL) scheduling information of uplink data to the corresponding user equipment to notify information related to time and frequency domains that can be used by the corresponding user equipment, encoding, data size, and HARQ. An interface for transmitting user traffic or control traffic can be used between the base stations. A Core Network (CN) may include the AG and a network node or the like for user registration of the UE. The AG manages mobility of a UE on a TA (Tracking Area) unit basis, wherein one TA unit includes a plurality of cells.

The wireless communication technology has been developed up to the LTE based upon WCDMA. However, the demands and expectations of the users and the manufacturers and providers are growing continuously. Also, since other wireless access technologies are constantly being developed, the wireless communication technology is required to newly evolve in order to ensure competiveness in the future. Accordingly, characteristics, such as reduced cost for each bit, extended service availability, usage of a flexible frequency band, simple structure and open interface, and adequate power consumption of the user equipment are being requested.

SUMMARY OF THE INVENTION

Based upon the discussions made as described above, hereinafter, the present invention proposes a method of receiving data from a base station at a relay node in a wireless communication system and apparatus thereof.

In an aspect of the present invention, in a method used by a relay node for receiving a relay node specific downlink physical shared channel (R-PDSCH) from a base station in a multiple antennae wireless communication system, a method for receiving a relay node specific downlink physical shared channel includes the steps of demodulating a relay node specific downlink physical control channel (R-PDCCH) by using a relay node specific reference signal; and, in case a specific downlink information is detected from the demodulated relay node specific downlink physical control channel, demodulating the relay node specific downlink physical shared channel, under an assumption that the relay node specific downlink physical shared channel is transmitted through a single antenna port by using a predetermined antenna port and scrambling identifier (ID).

Meanwhile, in another aspect of the present invention, as a relay node in a multiple antennae wireless communication system, the relay node includes a receiving mode configured to receive a relay node specific downlink physical control channel (R-PDCCH) and a relay node specific downlink physical shared channel (R-PDSCH) from a base station; and a processor configured to demodulate the relay node specific downlink physical control channel based upon a relay node specific reference signal, and configured to decode the relay node specific downlink physical shared channel in accordance with a specific downlink control information, which is detected from the demodulated relay node specific downlink physical control channel, and wherein the processor may demodulate the relay node specific downlink physical shared channel, under an assumption that the relay node specific downlink physical shared channel is transmitted through a single antenna port by using a predetermined antenna port and scrambling identifier (ID).

Herein, the relay node specific reference signal may correspond to a Demodulation-Reference Signal (DM-RS), the specific downlink control information may correspond to a downlink control information designating a Fallback Mode, and the downlink control information designating a Fallback Mode may correspond to a DCI (Downlink Control Information) format 1A.

Preferably, the predetermined antenna port and scrambling ID may respectively correspond to an antenna port and scrambling ID of the relay node specific reference signal that is used during the demodulation of the relay node specific downlink physical control channel, and the predetermined antenna port and scrambling ID may respectively correspond to antenna port 7 and scrambling ID 0.

According to the embodiments of the present invention, in a wireless communication system, a relay node may effectively receive a control channel from the base station.

Additional effects of the present application will be set forth in part in the description which follows and in part will become apparent to those having ordinary skill in the art upon examination of the following or may be learned from practice of the present application.

DETAILED DESCRIPTION OF THE INVENTION

Hereinafter, reference will now be made in detail to the preferred embodiments of the present invention, examples of which are illustrated in the accompanying drawings. The detailed description of the present invention is provided to facilitate the understanding of the configuration, operation, and other characteristics of the present invention. The following embodiments of the present invention correspond to examples wherein the technical features of the present invention are applied in the 3GPP system.

The description of the present invention will describe the embodiments of the present invention by using the LTE system and the LTE-A system. However, this is merely exemplary, and, therefore, the present invention may be applied to any other corresponding to the above-described definition. Also, the description of the present invention will also describe the embodiments of the present invention based upon an FDD method. However, this is also merely exemplary, and, therefore, the present invention may also be easily modified and applied to an H-FDD method or a TDD method.

Figure 1:
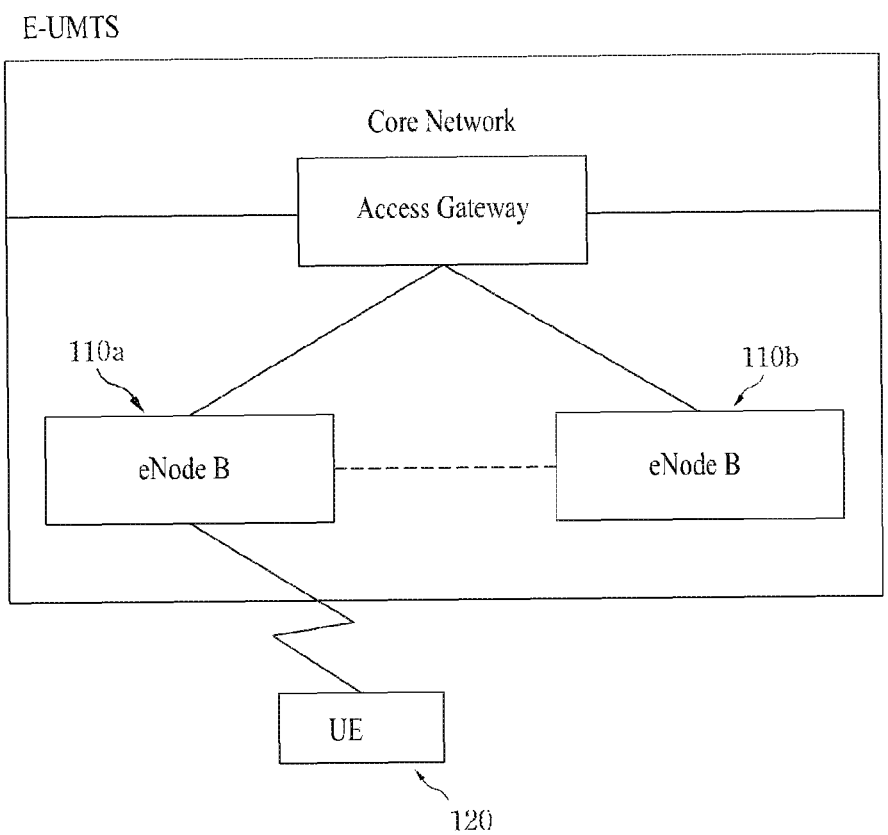
FIG. 1 illustrates a general view of an E-UMTS network structure as an example of a wireless communication system.
Figure 2:
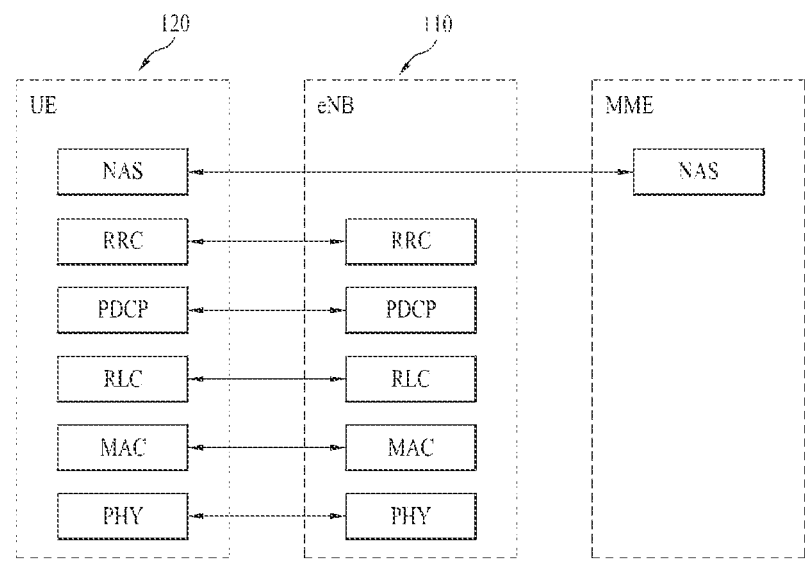
FIG. 2 illustrates a Control Plane structure and a User Plane structure of a Radio Interface Protocol between a user equipment and the E-UTRAN based upon the 3GPP radio access network standard.
Figure 2:
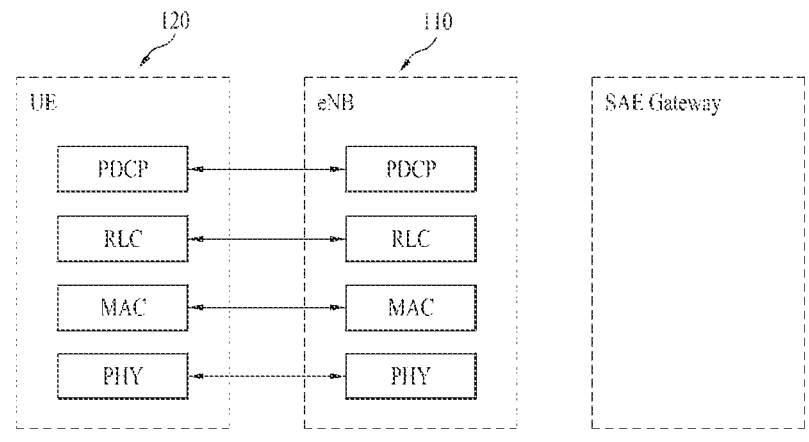

FIG. 2 illustrates a Control Plane structure and a User Plane structure of a Radio Interface Protocol between a user equipment and the E-UTRAN based upon the 3GPP radio access network standard. A control plane refers to a path through which control messages are transmitted. Herein, the control messages are used by the User Equipment (UE) and network in order to manage a unit. And, a user plane refers to a path through which data generated from an application layer are transmitted. Such data may include audio data or Internet packet data, and so on.

A first layer, which corresponds to a physical layer, uses a physical channel to provide an Information Transfer Service to a higher layer. The physical layer is connected to a Medium Access Control layer, which corresponds to a higher layer, through a Transport Channel. And, herein, data is transported between the Medium Access Control layer and the physical layer through the Transport Channel. In a data transmission between a physical layer of the transmitting end and a physical layer of the receiving end, data are transported between the physical layers through a physical channel. Herein, the physical layer uses time and frequency as radio resource. More specifically, in a downlink, the physical channel is modulated by using an OFDMA (Orthogonal Frequency Division Multiple Access) scheme, and, in an uplink, the physical channel is modulated by using an SC-FDMA (Single Carrier Frequency Division Multiple Access) scheme.

A Medium Access Control (MAC) layer of a second layer provides services to a Radio Link Control (RLC) layer, which corresponds to higher layer, through a logical channel. The Radio Link Control (RLC) layer of the second layer supports the transmission of reliable data. The function of the RLC layer may also be realized by a functional block within the MAC. A PDCP (Packet Data Convergence Protocol) layer of the second layer performs a header compression function, which can reduce unnecessary control information in order to efficiently transmit IP packets, such as IPv4 or IPv6, in a wireless (or radio) interface having a narrow bandwidth.

A radio resource control (RRC) layer which is positioned in a lowermost portion of a third layer is defined only in the control plane. And, in relation with the configuration, re-configuration, and release of radio bearers (RBs), the RRC layer performs the role of controlling the logical channels, the transmission channels, and the physical channels. The RB refers to a service that is provided by the second layer in order to deliver (or transport) data between the UE and the network. In order to do so, the RRC layers of the UE and the network exchanges RRC messages to and from one another. If an RRC connection exists between the RRC layer of the UE and the RRC layer of the network, the user equipment is in an RRC Connected Mode. And, if not, the user equipment is in an RRC Idle Mode. An NAS (Non-Access Stratum) layer, which is located above the RRC layer performs the roles of Session Management and Mobility Management.

One cell that configures a base station (eNB) is set to one of bandwidths of 1.25, 2.5, 5, 10, and 20 Mhz, thereby providing a downlink or uplink transport service to several user equipments. Different cells may be set to provide different bandwidths.

In the network, downlink transmission channels that transmit data to the UE include a BCH (Broadcast Channel), which transmits system information, a PCH (Paging Channel), which transmits paging messages, and a downlink SCH (Shared Channel), which transmits information other than the system information, such as user traffic or control messages.

In case of traffic information or control messages of a downlink multicast or broadcast service, the corresponding data may be transmitted through a downlink SCH or may also be transmitted through a separate downlink MCH (Multicast Channel). Meanwhile, uplink transmission channels that transmit data from the UE to the network include a RACH (Random Access Channel), which transmits initial control messages, and an uplink SCH (Shared Channel), which transmits information other than the system information, such as user traffic or control messages. Logical Channels being in a level higher than the transmission channel and being mapped to the transmission channel include a BCCH (Broadcast Channel), a PCCH (Paging Control Channel), a CCCH (Common Control Channel), an MCCH (Multicast Control Channel), an MTCH (Multicast Traffic Channel), and so on.

Figure 3:
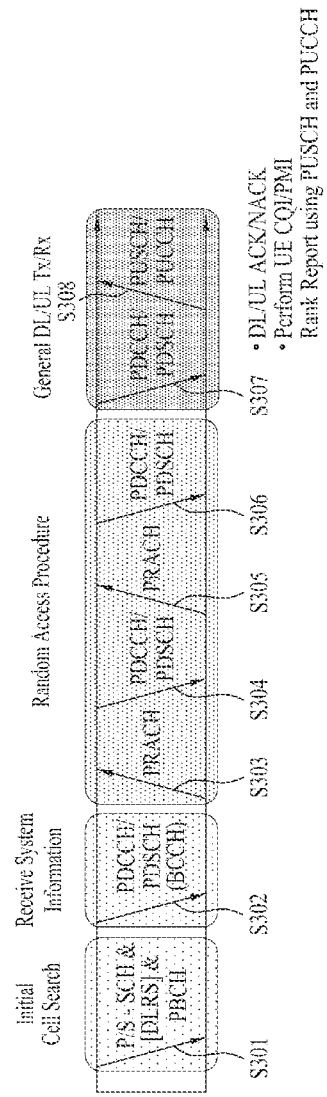
FIG. 3 illustrates physical channels that are used in the 3GPP system and a general method for transmitting signals using such physical channels.

FIG. 3 illustrates physical channels that are used in the 3GPP system and a general method for transmitting signals using such physical channels.

The user equipment performs initial cell search such as synchronization with the base station, when it newly enters a cell or when the power is turned on (S301). In order to do so, the user equipment synchronizes with the base station by receiving a Primary Synchronization Channel (P-SCH) and a Secondary Synchronization Channel (S-SCH) from the base station, and then acquires information such as cell ID, and so on. Thereafter, the user equipment may acquire broadcast information within the cell by receiving a Physical Broadcast Channel from the base station. Meanwhile, in the step of initial cell search, the user equipment may receive a Downlink Reference Signal (DL RS) so as to verify the downlink channel status.

Once the user equipment has completed the initial cell search, the corresponding user equipment may acquire more detailed system information by receiving a Physical Downlink Control Channel (PDCCH) and a Physical Downlink Shared Channel (PDSCH) based upon the respective information carried in the PDCCH (S302).

Meanwhile, if the user equipment initially accesses the base station, or if there are no radio resources for signal transmission, the user equipment may perform a Random Access Procedure (RACH) with respect to the base station (S303 to S306). In order to do so, the user equipment may transmit a specific sequence to a preamble through a Physical Random Access Channel (PRACH) (S303 and S305), and may receive a response message respective to the preamble through the PDCCH and the PDSCH corresponding to the PDCCH (S304 and S306). In case of a contention based RACH, a Contention Resolution Procedure may be additionally performed.

After performing the above-described process steps, the user equipment may perform PDCCH/PDSCH reception (S307) and Physical Uplink Shared Channel (PUSCH)/Physical Uplink Control Channel (PUCCH) transmission (S308), as general uplink/downlink signal transmission procedures. Particularly, the user equipment receives Downlink Control Information (DCI) through the PDCCH. Herein, the DCI includes control information, such as resource allocation information respective to the user equipment. Herein, the format of the DCI may vary depending upon its purpose of usage.

Meanwhile, the control information, which is transmitted by the user equipment to the base station or received by the user equipment from the base station via uplink, includes downlink/uplink ACK/NACK signals, a CQI (Channel Quality Indicator), a PMI (Precoding Matrix Index), an RI (Rank Indicator), and so on. In case of the 3GPP LTE system, the user equipment may transmit control information, such as the above-described CQI/PMI/RI through the PUSCH and/or the PUCCH.

Figure 4:
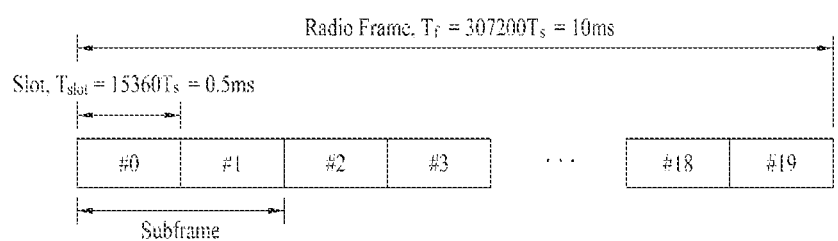
FIG. 4 illustrates an exemplary structure of a radio frame that is used in the LTE system.

FIG. 4 illustrates an exemplary structure of a radio frame that is used in the LTE system.

Referring to FIG. 4, a radio frame has the length of 10 ms ($327200 \times T_S$) and is configured of 10 subframes each having the same size. Each subframe has the length of 1 ms and is configured of 2 slots. Each slot has the length of 0.5 ms ($15360 \times T_S$). Herein, $T_S$ represents a sampling time and is indicated as $T_S=1/(15\ \text{kHz} \times 2048)=3.2552 \times 10^{-8}$ (approximately 33 ns). A slot includes a plurality of OFDM symbols in the time domain and includes a plurality of Resource Blocks (RBs) in the frequency domain. In the LTE system, one resource block includes 12 subcarriers×7(6) OFDM symbols. A TTI (Transmission Time Interval), which corresponds to a unit time during which data are transmitted, may be decided as one or more subframe units. Herein, the above-described radio frame structure is merely exemplary. And, therefore, the number of subframes included in a radio frame, or the number of slots included in a subframe, or the number of OFDM symbols included in a slot may be diversely varied.

Figure 5:
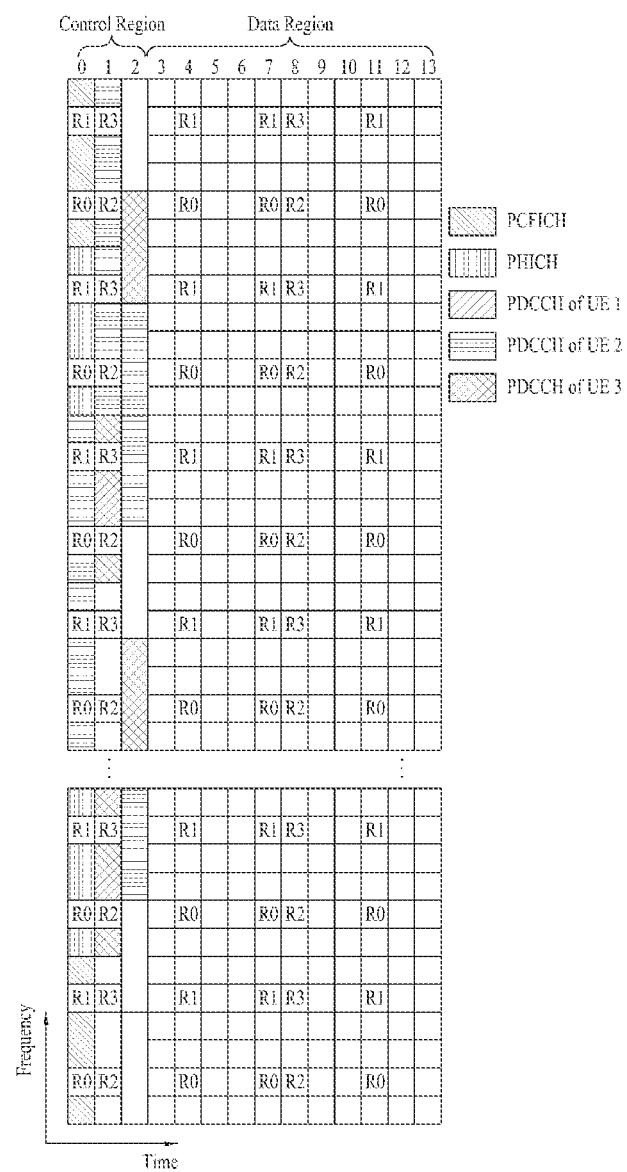
FIG. 5 illustrates an exemplary structure of a downlink radio frame that is used in the LTE system.

FIG. 5 illustrates an exemplary structure of a downlink radio frame that is used in the LTE system.

Referring to FIG. 5, one subframe is configured of 14 OFDM symbols. Depending upon the subframe settings, the first one to three OFDM symbols are used as the control region, and the remaining 13~11 OFDM symbols are used as the data region. Referring to the drawing, R1 to R4 respectively represent Reference Signals (RSs) or Pilot Signals for antennas 0 to 3. Regardless of the control region and the data region, the RS is fixed within the subframe according to a consistent pattern. A control channel is allocated to resources of the control region to which the RS is not allocated. And, a traffic channel is allocated to resources of the data region to which the RS is not allocated. Control channels that are allocated to the control region may include a PCFICH (Physical Control Format Indicator CHannel), a PHICH (Physical Hybrid-ARQ Indicator CHannel), a PDCCH (Physical Downlink Control CHannel), and so on.

As a Physical Control Format Indicator Channel, the PCFICH notifies the user equipment of the number of OFDM symbols used in the PDCCH for each subframe. The PCFICH is located in the first OFDM symbol and is configured at a higher priority level than the PHICH and the PDCCH. The PCFICH is configured of 4 REGs (Resource Element Groups), and each REG is distributed (or spread) within the control region based upon the Cell ID (Cell Identity). One REG is configured of 4 REs (Resource Elements). An RE represents a minimum physical resource defined by one subcarrier×one OFDM symbol. The PCFICH value indicates a value ranging from 1 to 3 or from 2 to 4 depending upon the bandwidth and is modulated by using QPSK (Quadrature Phase Shift Keying).

As a Physical HARQ (Hybrid-Automatic Repeat and request) Indicator Channel, the PHICH is used for delivering HARQ ACK/NACK respective to uplink transmission. More specifically, the PHICH represents a channel through which DL ACK/NACK information for UL HARQ is transmitted. The PHICH consists of one REG and is cell-specifically scrambled. An ACK/NACK is indicated by 1 bit and is modulated by using BPSK (Binary phase shift keying). The modulated ACK/NACK is distributed (or spread) by a Spreading Factor (SF)=2 or 4. A plurality of PHICH being mapped to the same resource configures a PHICH group. The number of PHICHs being multiplexed in the PHICH group is decided in accordance with the number of spreading codes. The PHICH (group) is repeated 3 times in order to obtain diversity gain in the frequency domain and/or the time domain.

As a Physical Downlink Control Channel, the PDCCH is allocated to the first n number of OFDM symbols of a subframe. Herein, n is an integer equal to or greater than 1, and n is designated by the PCFICH. The PDCCH is configured of one or more CCEs. The PDCCH notifies each user equipment or a user equipment group of information associated to resource allocation of a PCH (Paging Channel) and a DL-SCH (Downlink-shared channel), Uplink Scheduling Grant, HARQ information, and so on. The PCH (Paging Channel) and the DL-SCH (Downlink-shared channel) are transmitted through the PDSCH. Therefore, with the exception for specific control information or specific service data, the base station and the user equipment generally transmit and receive data through the PDSCH.

Information on the user equipment (one user equipment or a plurality of user equipments) to which the data of the PDSCH are to be transmitted, and information on how the user equipments receive and decode the transmitted PDSCH data are included in the PDCCH and transmitted. For example, it is assumed that a specific PDCCH is processed with CRC masking with an RNTI (Radio Network Temporary Identity) "A", and it is also assumed that information on the data being transmitted by using a radio resource (e.g., frequency position) "B" and a transmission format information (e.g., transmission block size, modulation method, coding information, etc.) "C" are transmitted through a specific subframe. In this case, a user equipment within a cell uses its own RNTI so as to monitor the PDCCH. And, when one or more user equipments carries RNTI "A", the corresponding user equipments receive the PDCCH and then receive the PDSCH, which is indicated by "B" and "C", through the received PDCCH information.

Description will now be made on a MIMO system. MIMO (Multiple-Input Multiple-Output) corresponds to a method of using multiple transmission antennae and multiple reception antennae. Herein, by using this method enables data transmission and reception efficiency may be enhanced. More specifically, by using multiple antennae in a transmitting end or receiving end of a wireless communication system, the capacity may be increased, and the performance may be enhanced. Hereinafter, in this document, MIMO may also be referred to as 'multiple antennae (or multi-antennae)'.

In the multiple antennae technology, the reception of one whole message does not depend upon a single antenna path. Instead, in the multiple antennae technology, data may be completed by combining (or merging) a plurality of fragments received from multiple antennae. When using the multiple antennae technology, a data transmission rate within a cell area having a specific size may be enhanced, or a system coverage may be increased by ensuring a specific data transmission rate. Also, this technology may be broadly used in mobile communication terminals and relay stations. Furthermore, by using the multiple antennae technology, limitations in the transmission size that occur during the related art mobile communication, which uses a single antenna, may be overcome.

Figure 6:
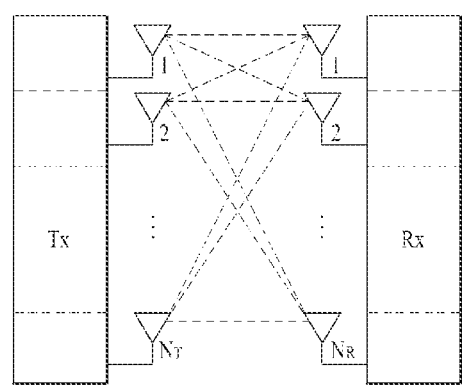
FIG. 6 illustrates a schematic view showing the structure of a multiple antenna (MIMO) communication system.

A schematic view showing the structure of a general multiple antenna (MIMO) communication system is shown in FIG. 6. Herein, $N_T$ number of transmission antennae is installed in the transmitting end, and $N_R$ number of reception antennae is installed in the receiving end. As described above, when both the transmitting end and the receiving end use multiple antennae, a theoretical channel transmission capacity may be more increased, as compared to when only either one of the transmitting end and the receiving end uses multiple antennae. The channel transmission capacity increases in proportion to the number of antennae. Therefore, the transmission rate may be enhanced, and a frequency rate may also be enhanced. If the maximum transmission rate when using a single antenna is referred to as $R_o$, theoretically, the transmission rate when using multiple antennae may be increased as much as the maximum transmission rate $R_o$ multiplied by a rate increase rate $R_i$, as shown in Equation 1.

$$R_i = \min(N_T, N_R) \quad \text{[Equation 1]}$$

For example, in a MIMO communication system using 4 transmission antennae and 4 reception antennae, a theoretical transmission rate 4 times that of a single antenna system may be acquired. Evidence of such theoretical capacity increase of the multiple antennae system was found and proven in the mid 90's. And, since then, diverse technologies for actually enhancing the data transmission rate have been under research and development. And, among such technologies, some of the technologies are already being applied in diverse wireless communication standards, such as the $3^{rd}$ generation mobile communication and the next generation wireless LAN.

Up to now, the research and development associated to multiple antennae have been actively and diversely carried out in many aspects, such as research in the aspect of information theory associated to multiple antennae communication capacity calculation in diverse channel environments and multiple access environments, research in drawing out wireless channel measurements and models of a multiple antennae system, research in time/space signal processing technologies for enhancing transmission reliability and for enhancing the transmission rate, and so on.

In order to provide a more detailed description of the communication method in a multiple antennae system, a mathematical modeling of the communication method may be shown as follows. As shown in FIG. 6, it will be assumed that NT number of transmission antennae and NR number of reception antennae exist herein. First of all, in case of a transmitted signal (or transmission signal), since a maximum number of information available for transmission in equal to NT, when NT number of transmission antennae exists, the transmission information may be indicated in the form of a vector as shown in Equation 2 below.

$$s = [s_1, s_2, \ldots, s_{N_T}]^T \quad \text{[Equation 2]}$$

Meanwhile, a transmission power may vary for each of the transmission information $s_1, s_2, \ldots, s_{N_T}$. And, in this case, when each of the transmission power is referred to as $P_1, P_2, \ldots, P_{N_T}$, the transmission information having its transmission power adjusted may be expressed in a vector form as shown in Equation 3 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, by using a diagonal matrix P of the transmission power, $\hat{s}$ may be indicated as shown in Equation 4 below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, consideration will be made on the configuration of $N_T$ number of transmitted signals $x_1, x_2, \ldots, x_{N_T}$ that are actually being transmitted, when a weight matrix W is applied to the information vector $\hat{s}$ having its transmission power adjusted. Herein, the weight matrix performs the role of adequately distributing transmission information to each antenna in accordance with the transmission channel status (or situation). Such transmitted signals $x_1, x_2, \ldots, x_{N_T}$ may be expressed as shown in Equation 5 by using the vector X. Herein, $W_{ij}$ represents a weight between an $i^{th}$ transmission antenna and a $j^{th}$ information. W is referred to as a Weight Matrix or a Precoding Matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & \vdots & \ddots & \\ w_{i1} & w_{i2} & \cdots & w_{iN_T} \\ \vdots & \vdots & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$

[Equation 5]

$$W\hat{s} = WPs$$

Generally, the physical meaning of a rank of a channel matrix may be defined as a maximum number of information, each being different from one another, that can be transmitted in a given channel. Therefore, since the rank of a channel matrix is defined as a minimum number, among the number of independent rows and independent columns, the rank of the matrix cannot be greater than the number of rows or the number of columns. For example, in a mathematical form, a rank (rank(H)) of channel matrix H is limited to the range shown in Equation 6.

$$\text{rank}(H) \leq \min(N_T, N_R) \quad \text{[Equation 6]}$$

Furthermore, it will also be said that each of the different information transmitted by using the multiple antennae technology is defined as a 'transmission stream' or simply a 'stream'. Such 'stream' may also be referred to as a 'Layer'. Evidently, the number of transmission streams cannot be greater than the rank of the channel having the maximum number for transmitting information, each set of information being different from one another. Therefore, the channel matrix H may be expressed as shown in Equation 7 below.

$$\# \text{ of streams} \leq \text{rank}(H) \leq \min(N_T, N_R) \quad \text{[Equation 7]}$$

Herein, "# of streams" indicates the number of streams. Meanwhile, it shall be noted that one stream may be transmitted through at least one or more antennae.

Diverse methods for corresponding at least one or more streams to multiple antennae may exist. Such methods may hereinafter be described in accordance with the type of multiple antennae technology. In case one stream is transmitted by passing through multiple antennae, the method may correspond to a spatial diversity scheme. And, in case a plurality of streams is transmitted by passing through multiple antennae, the method may correspond to a spatial multiplexing scheme. Evidently, an intermediate method corresponding to a hybrid form of the spatial diversity scheme and the spatial multiplexing scheme may also exist.

Hereinafter, a detailed description will be made on reference signals. Generally, in order to measure a channel, a reference signal, which is already known by both the transmitting end and the receiving end, is transmitted from the transmitting end to the receiving end along with the data. Such reference signal may not only perform the function of channel measurement but may also perform the function of notifying a modulation method so that a demodulation process can be performed. Reference signals may be categorized as a dedicated reference signal (RS) (DRS) for a base station and a specific user equipment (UE), i.e., a UE-specific reference signal, and as a common reference signal (RS) (CRS), which corresponds to a cell-specific reference for all user equipments within the corresponding cell. Furthermore, a cell-specific reference includes a reference signal that is used for measuring CQI/PMI/RI from the user equipment and for reporting the measurements to the base station, and this may also be referred to as a CSI-RS (Channel State Information-RS).

Figure 7:
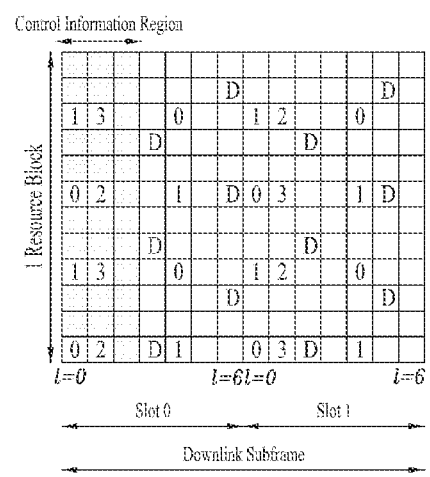
FIG. 7 illustrates the structure of a reference signal in an LTE system, which supports downlink transmission using 4 transmission antennae.
Figure 7:
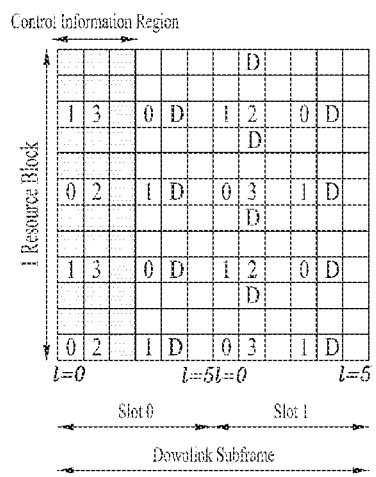

FIG. 7 illustrates the structure of a reference signal in an LTE system, which supports downlink transmission using 4 transmission antennae. Most particularly, FIG. 7a illustrates the case of a normal cyclic prefix, and FIG. 7b illustrates the case of an extended cyclic prefix.

Referring to FIG. 7, the numbers 0 to 3 that are marked in the grid each corresponds to a CRS (Common Reference Signal), which refers to a cell-specific reference signal corresponding to each of the antenna ports 0 to 3 and being transmitted for channel measurement and data demodulation. And, the CRS, which corresponds to the cell-specific RS, may be transmitted to the user equipment by passing through a data information region as well as the overall control information region.

Furthermore, the letter 'D' that is marked in the grid indicates a downlink DM-RS (Demodulation-RS), which corresponds to a UE-specific reference signal. Herein, the DM-RS supports a single antenna port transmission through the data region, i.e., PDSCH. The user equipment is signaled with information on whether or not the DM-RS corresponding to the UE-specific RS exists, through a higher-level layer.

Meanwhile, the mapping rule of the reference signal to a resource block (RB) may be expressed as shown in Equation 8 to Equation 10 below. Equation 8 shown below corresponds to an equation for indicating a CRS mapping rule. Additionally, Equation 9 shown below corresponds to an equation for indicating a DRS mapping rule, wherein a general CP is applied to the DRS, and Equation 10 shown below corresponds to an equation for indicating a DRS mapping rule, wherein an extended CP is applied to the DRS.

$$k = 6m + (v + v_{shift}) \mod 6 \quad \text{[Equation 8]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \mod 2) & \text{if } p = 2 \\ 3 + 3(n_s \mod 2) & \text{if } p = 3 \end{cases}$$

$$v_{shift} = N_{ID}^{cell} \mod 6$$

$$k = (k') \mod N_{sc}^{RB} + N_{sc}^{RB} \cdot n_{PRB} \quad \text{[Equation 9]}$$

$$k' = \begin{cases} 4m' + v_{shift} & \text{if } l \in \{2, 3\} \\ 4m' + (2 + v_{shift}) \mod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \mod 2 = 0 \\ 2, 3 & \text{if } n_s \mod 2 = 1 \end{cases}$$

$$m' = 0, 1, \ldots, 3N_{RB}^{PDSCH} - 1$$

$$v_{shift} = N_{ID}^{cell} \mod 3$$

-continued $$k = (k') \bmod N_{sc}^{RB} + N_{sc}^{RB} \cdot n_{PRB} \quad \text{[Equation 10]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

Referring to Equation 8 to Equation 10, k and p each represents a subcarrier index and an antenna port. Each of the $N_{RB}^{DL}$, ns, $N_{cell}^{ID}$, may respectively indicate the number of RBs allocated to the downlink, the number of index slots, and the number of cell IDs. Herein, the position of the RS may vary in the frequency domain perspective in accordance with a $V_{shift}$ value.

Hereinafter, according to the descriptions made in the current LTE standard document, a transmission mode (TM) for transmitting the PDSCH will now be described.

Figure 8:
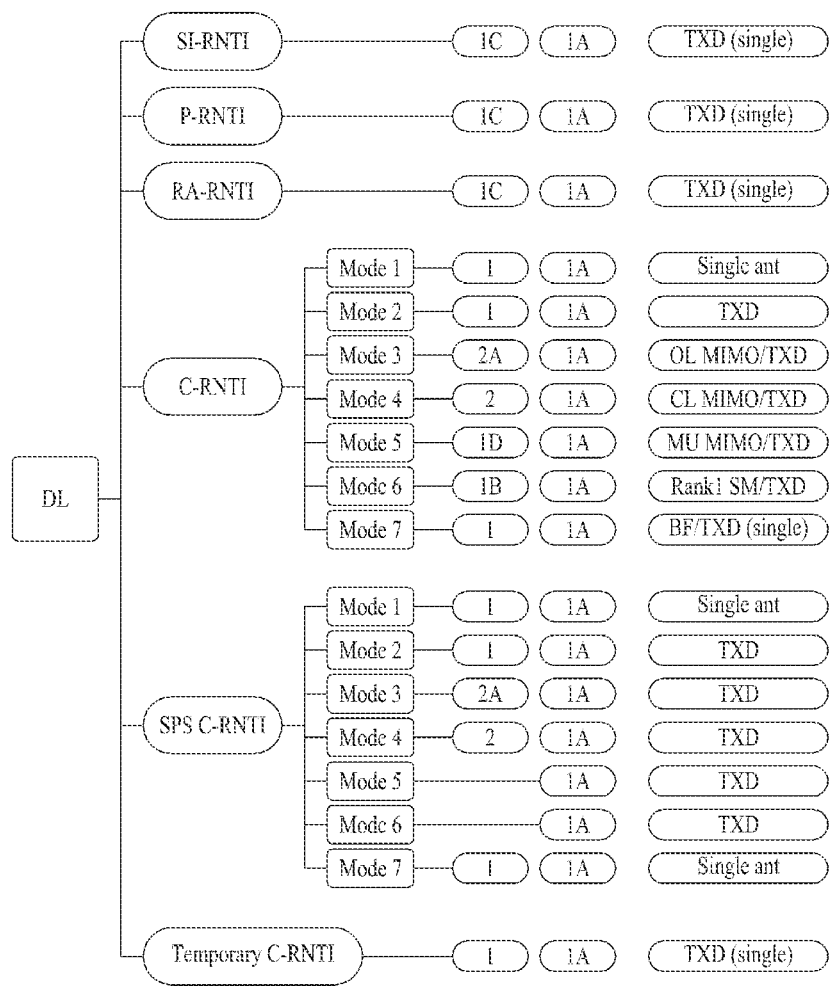
FIG. 8 illustrates a relation between a transmission mode for transmitting a PDSCH and a DCI format designated by a PDCCH.

FIG. 8 illustrates a relation between a transmission mode for transmitting a PDSCH and a DCI format designated by a PDCCH. As described above, information on how a user equipment is to receive and decode PDSCH data is included in the PDCCH and transmitted. Accordingly, the PDDCH may be CRC masked with an RNTI (Radio Network Temporary Identity) referred to as "A" and may include information on a DCI format for receiving the PDSCH.

Referring to FIG. 8, a DCI format according to the RNTI type having the PDCCH masked therein is indicated. Most particularly, in case of the C-RNTI and the SPS C-RNTI, FIG. 8 shows the transmission mode and its respective DCI format, i.e., the transmission mode based DCI format. Additionally, a DCI format 1A that can be applied regardless of each transmission mode is also defined herein.

Most particularly, the DCI format 1A corresponds to a fallback mode DCI format for scheduling a PDSCH codeword, which is used for the purpose of performing a stable signal transmission and reception during a change in the transmission mode or during a reconfiguration process of an RRC connection between the base station and the user equipment. For example, when a time point of applying a reconfigured parameter does not match (or coincide) during the reconfiguration process between the base station and the user equipment, the base station may transmit the PDSCH by using the DCI format 1A.

More specifically, according to the current standard document, regardless of the transmission mode, if a DCI format 1A is detected from a PDCCH, which is masked with a C-RNTI, in case the PDCCH is demodulated by using the CRS of the single antenna port, the PDSCH is decoded under the assumption that a single antenna transmission of antenna port 0 is performed. In other cases, decoding is performed under the assumption that the PDSCH is transmitted by using a transmission diversity method.

Meanwhile, in an LTE-A system, which is a standard for the next generation mobile communication system, it is expected that a CoMP (Coordinated Multi Point) method, which is not supported in the current standard, will be supported for the enhancement of the data transmission rate. Herein, the CoMP system refers to a system wherein 2 or more base stations or cell perform a cooperative communication with the user equipment, in order to enhance the communication performance between a user equipment and a base station (cell or sector), which are located in shadow areas.

The CoMP method may be categorized into a Joint Processing method of a cooperative MIMO format (i.e., CoMP-Joint Processing (CoMP-JP) method) and a CoMP-Coordinated Scheduling/Beamforming method.

In case of a downlink, in the CoMP-JP method, the user equipment may instantly receive data at the same time from each base station performing CoMP. Then, by combining the signals received from the base stations, the user equipment may enhance the receiving performance. Alternatively, in the CoMP-Coordinated Scheduling/Beamforming method (CoMP-CS), the user equipment may instantly receive data through a single base station by performing beamforming.

In case of an uplink, in the CoMP-JP method, each base station may simultaneously receive a PUSCH signal from the user equipment. Alternatively, in the CoMP-Coordinated Scheduling/Beamforming method (CoMP-CS), only one base station may receive the PUSCH. At this point, a decision on whether or not the CoMP-Coordinated Scheduling/Beamforming method (CoMP-CS) is to be used is decided by the cooperating cells (or base stations).

Meanwhile, if the channel status between the base station and the user equipment is poor (or deficient), a Relay Node (RN) may be installed, so that a radio channel having a more enhanced channel status can be provided to the user equipment. Also, by adopting and using a relay node from the base station in a cell boundary region having a poor channel status, a data channel having a faster rate may be provided, and a cell service region may be extended. As described above, the relay node, which is currently most broadly used, corresponds to a technology that is adopted to resolve radio shadow areas within the wireless (or radio) communication system.

As opposed to the precedent methods, which were limited to the functions of a repeater transmitting signals by simply amplifying the signals, the recent methods have been evolving to a more intelligent form. Furthermore, the relay node technology corresponds to a technology that is required for reducing costs for additional base station installation and costs for maintaining a backhaul network within the next generation mobile communication system, and that is, at the same time, required for extending service coverage and enhancing the data processing rate. As the relay node technology is gradually being developed, the relay node that is used in the related art wireless communication system is required to be supported by the new mobile communication system.

In the 3GPP LTE-A (3rd Generation Partnership Project Long Term Evolution-Advanced) system, by adopting the function of forwarding a link access (or link connection) between the base station and the user equipment to the relay node, two types of links, each having a different property, may be applied to each of the uplink and downlink carrier frequency bands. An access link portion configured between the links of the base station and the relay node is defined and expressed as a backhaul link. And, a transmission that is realized in an FDD (Frequency Division Duplex) or TDD (Time Division Duplex) method by using a downlink resource may be referred to as a backhaul downlink, and a transmission that is realized in an FDD (Frequency Division Duplex) or TDD (Time Division Duplex) method by using an uplink resource may be referred to as a backhaul uplink.

Figure 9:
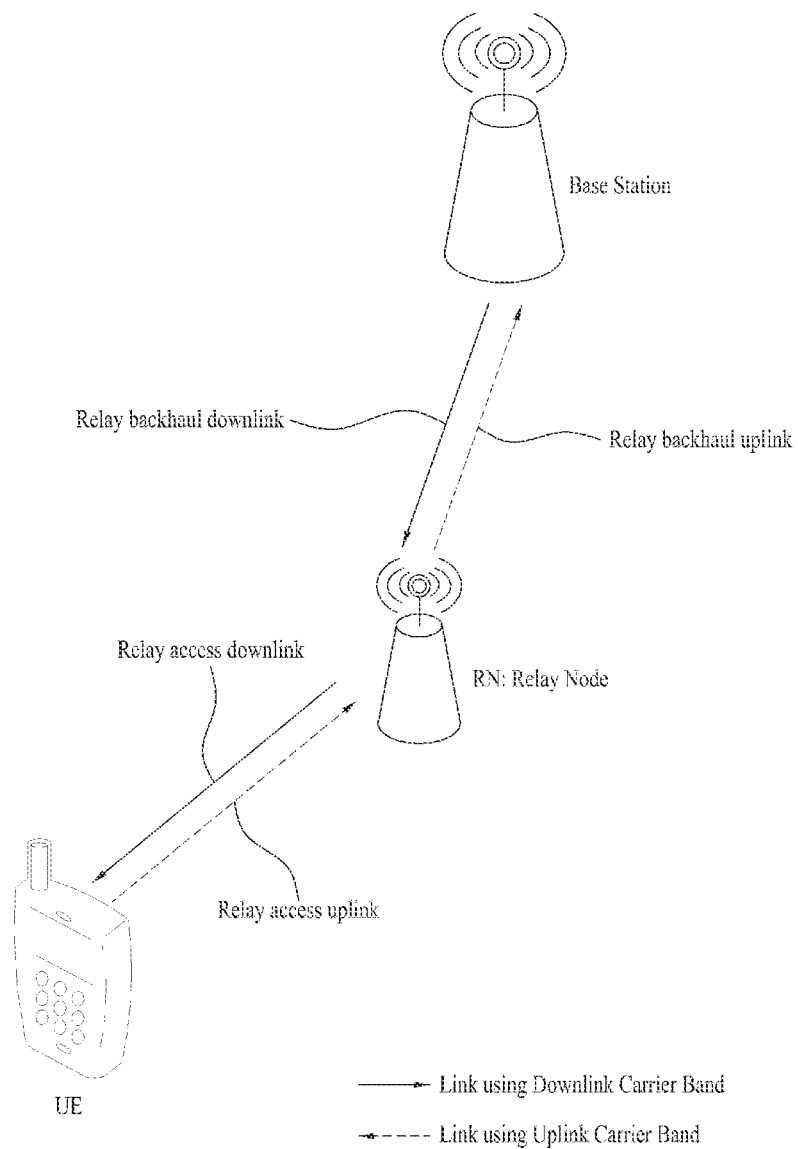
FIG. 9 illustrates structures of a relay backhaul link and a relay access link in a wireless communication system.

FIG. 9 illustrates structures of a relay backhaul link and a relay access link in a wireless communication system.

Referring to FIG. 9, as the relay node is adopted for the function of forwarding a link access (or link connection)

between the base station and the user equipment, two types of links, each having a different property, may be applied to each of the uplink and downlink carrier frequency bands. Herein, an access link portion configured between the links of the base station and the relay node is defined and expressed as a relay backhaul link. When transmission of the backhaul link is realized by using a downlink frequency band (in case of the Frequency Division Duplex (FDD)) or a downlink subframe (in case of the Time Division Duplex (TDD)) resource, the backhaul link may be referred to as a backhaul downlink, and when transmission of the backhaul link is realized by using an uplink frequency band (in case of the FDD) or an uplink subframe (in case of the TDD) resource, the backhaul link may be referred to as a backhaul uplink.

On the other hand, an access link portion configured between the relay node and a series of user equipments is defined and expressed as a relay access link. When transmission of the relay access link is realized by using a downlink frequency band (in case of the FDD) or a downlink subframe (in case of the TDD) resource, the relay access link may be referred to as an access downlink, and when transmission of the relay access link is realized by using an uplink frequency band (in case of the FDD) or a downlink subframe (in case of the TDD) resource, the relay access link may be referred to as an access uplink.

The relay node (RN) may receive information from the base station via relay backhaul downlink and may transmit information to the base station via relay backhaul uplink. Also, the relay node may transmit information to the user equipment via relay access downlink and may received information from the user equipment via relay access uplink.

Meanwhile, in association with the usage of a band (or spectrum) of the relay node, an 'in-band' refers to a case where the backhaul link operates in the same frequency band as the access link, and an 'out-band' refers to a case where the backhaul link operates in a same frequency band different from that of the access link. In both in-band and out-band, the user equipment (hereinafter referred to as a legacy user equipment) that operates in accordance with the conventional LTE system (e.g., Release-8) should be capable of accessing a donor cell.

Depending upon whether or not the user equipment recognizes the relay node, the relay node may be categorized as a transparent relay node or a non-transparent relay node. The relay node is determined as being transparent, when it is difficult to recognize whether or not the user equipment is communicating with the network through the relay node, and the relay node is determined as being non-transparent, when it is recognized that the user equipment is communicating with the network through the relay node In relation with the control of the relay node, the relay node may be identified as a relay node being configured as a portion of the donor cell or as a relay node controlling the cell by itself.

The relay node being configured as a portion of the donor cell may have a relay node identifier (ID). However, in this case, the relay node does not have its own cell identity. When at least a portion of an RRM (Radio Resource Management) is controlled by the base station to which the corresponding cell belongs (even if the remaining portions of the RRM are located in the relay node), the relay node is referred to as a relay node being configured as a portion of the donor cell. Preferably, such relay node may support the legacy user equipment. For example, diverse types of relay nodes, such as Smart repeaters, decode-and-forward relays, L2 (second layer) relay nodes, and Type-2 relay nodes correspond to such relay node.

In case of the relay node controlling the cell by itself, the relay node may control one cell or multiple cells, and the cell being controlled by the relay node may each be provided with a unique physical layer cell identity, and the same RRM mechanism may be used. In the perspective of the user equipment, there is no difference between accessing a cell that is being controlled by the relay node and accessing a cell that is being controlled by a general base station. Preferably, the cell that is being controlled by such relay node may support the legacy user equipment. For example, Self-backhauling relay nodes, L3 (third layer) relay nodes, Type-1 relay nodes, and Type-1a relay nodes may correspond to such relay node.

As an in-band relay node, the Type-1 relay node controls a plurality of cells, and each of the plurality of cell may be viewed by the user equipment as separate cells being differentiated from the donor cell. Also, each of the plurality of cells has its own physical cell ID (defined in LTE Release-8), and the relay node may transmits its synchronization channel, reference signal, and so on. In case of a single-cell operation, the user equipment may directly receive scheduling information and HARQ feedback from the relay node and may transmit its control channel (scheduling request (SR), CQI, ACK/NACK, etc.) to the relay node. Also, the Type-1 relay node may be viewed as a legacy base station (base station operating in accordance with the LTE Release-8 system) by the legacy user equipments (user equipments operating in accordance with the LTE Release-8 system). More specifically, backward compatibility is provided. Meanwhile, for the user equipments operating in accordance with the LTE-A system, the Type-1 relay node may be viewed as a base station other than the legacy base station. Thus, performance may be enhanced.

With the exception for operating as an out-band relay node, the Type-1a relay node has the same features and characteristics as the above-described Type-1 relay node. The operations of Type-1a relay node may be configured so that influence caused by the operations of L1 (first layer) can be minimized or eliminated.

As an in-band relay node, the Type-2 relay node does not have a separate physical cell ID and, accordingly, the Type-2 relay node does not create (or configure) a new cell. The Type-2 relay node corresponds to a transparent relay node for the legacy user equipment, and the legacy user equipment is incapable of recognizing the existence of the Type-2 relay node. The Type-2 relay node may transmit the PDSCH but does not transmit at least the CRS and the PDCCH.

Meanwhile, in order to enable the relay node to operate as an in-band relay node, a portion of the resource corresponding to the time-frequency domain should be reserved for a backhaul link, and this resource may be configured so that the corresponding resource cannot to be used for an access link. This is referred to as resource partitioning.

The general principle of resource partitioning in a relay node may be described as follows. A backhaul downlink and an access downlink may be multiplexed within a single carrier frequency by using a Time Division Multiplexing (TDM) scheme (i.e., only one of the backhaul downlink and the access downlink is activated at a specific time). Similarly, a backhaul uplink and an access uplink may be multiplexed within a single carrier frequency by using a TDM scheme (i.e., only one of the backhaul uplink and the access uplink is activated at a specific time).

Backhaul link multiplexing in the FDD may be described that a backhaul downlink transmission is performed in a downlink frequency band, and that a backhaul uplink transmission is performed in an uplink frequency band. Backhaul link multiplexing in the TDD may be described that a backhaul downlink transmission is performed in a downlink subframe of the base station and the relay node, and that a backhaul uplink transmission is performed in an uplink subframe of the base station and the relay node.

In case of the in-band relay node, for example, when a backhaul downlink reception from the base station and an access downlink transmission to the user equipment are realized at the same time in a predetermined frequency band, a signal being transmitted from a transmitting end of the relay node may be received by a receiving end of the relay node. And, accordingly, signal interference or RF jamming may occur in an RF front-end of the relay node. Similarly, when an access uplink reception from the user equipment and a backhaul uplink transmission to the base station are realized at the same time in a predetermined frequency band, a signal interference may occur in an RF front-end of the relay node. Therefore, in the relay node, if sufficient partitioning (e.g., installing a transmitting antenna and a receiving antenna by sufficiently spacing them apart geographically (e.g., above the ground level/underground)) between the receiving signal and the transmitting signal fails to be provided, it will be difficult to realize a simultaneous reception and transmission within a frequency band.

One of the methods for resolving such problem of signal interference is to configure the operations so that the relay node does not transmit a signal to the user equipment, while the relay node receives a signal from the donor cell. More specifically, a gap period is formed in the transmission from the relay node to the user equipment. And, the user equipment (including the legacy user equipment) may be configured to not expect any kind of transmission from the relay node during the gap period. This gap period may be set up by configuring an MBSFN (Multicast Broadcast Single Frequency Network) subframe.

Figure 10:
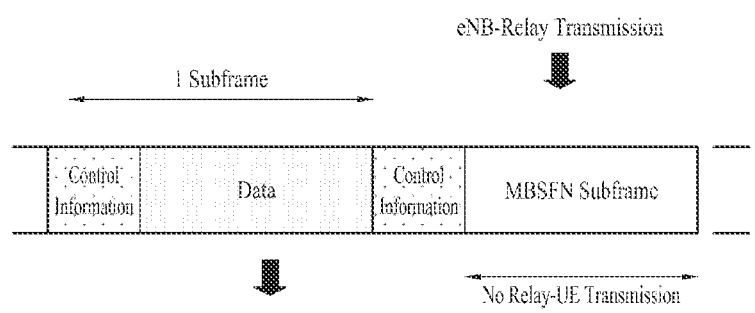
FIG. 10 illustrates an exemplary relay node resource division.

FIG. 10 illustrates an exemplary relay node resource division.

In FIG. 10, a first subframe corresponds to a general subframe, wherein a downlink (i.e., access downlink) control signal and data are transmitted from the relay station to the user equipment. And, a second subframe corresponds to an MBSFN subframe, wherein a control signal is transmitted from the relay node to the user equipment in the control region of the downlink subframe, and wherein no transmission is performed from the relay node to the user equipment in the remaining regions of the downlink subframe. Herein, in case of the legacy user equipment, since the transmission of a downlink physical layer channel (PDCCH) is expected in all downlink subframes (in other words, since the relay node is required to support the legacy user equipments within the regions of the relay node itself, so that the corresponding legacy user equipments can receive the PDCCH in each subframe and perform measurement functions), in order to allow the legacy user equipment to perform the correct operations, the PDCCH is required to be transmitted from all downlink subframes. Therefore, in a subframe (second subframe (1020)), which is configured to perform downlink (i.e., backhaul downlink) transmission from the base station to the relay node, in the first N number of OFDM symbol sections (wherein N=1, 2, or 3) of the subframe, instead of receiving a backhaul downlink, the relay node is required to perform access downlink transmission. Respectively, since the PDCCH is transmitted from the relay node to the user equipment in the control region of the second subframe, backward compatibility for a legacy user equipment, which is served by the relay node, may be provided. In the remaining regions of the second subframe, while no transmission is performed from the relay node to the user equipment, the relay node may receive transmission from the base station. Therefore, by using such resource partitioning method, access downlink transmission and backhaul downlink reception may not be performed simultaneously in the in-band relay node.

A second subframe using an MBSFN subframe will now be described in detail. The control region of the second subframe may be referred to as a relay node non-hearing section. The relay node non-hearing section refers to a section that does not receive backhaul downlink signal and that transmits an access downlink signal. As described above, this section may be configured to have the length of 1, 2, or 3 OFDM. In the relay node non-hearing section, the relay node may perform access downlink transmission to the user equipment, and, in the remaining regions, the relay node may receive backhaul downlink from the base station. At this point, since the relay node cannot simultaneously perform transmission and reception in the same frequency band, a considerable amount of time is required for the relay node to switch from the transmission mode to the reception mode. Therefore, a guard time (GT) is required to be set up so that the relay node can switch to and from the transmission/reception modes, during the first partial section of the backhaul downlink reception region. Similarly, even when the relay node is operated to receive a backhaul downlink from the base station and to transmit an access downlink to the user equipment, a guard time (GT) is required to be set up so that the relay node can switch to and from the transmission/reception modes. A time domain value may be given as the length of such guard time, for example, k (k≥1) number of time sample (Ts) may be given as the length of the guard time, or at least one or more OFDM symbol length may be given as the guard time length. Alternatively, in case relay node backhaul downlink subframes are consecutively configured, or depending upon a predetermined subframe timing alignment relation, the guard time of the last portion of the subframe may not be defined nor configured. In order to maintain such backward compatibility, the guard time may be defined only in the frequency domain, which is configured for backhaul downlink subframe transmission (in case the guard time is configured in an access downlink section, the legacy user equipment cannot be supported). In the backhaul downlink reception section excluding the guard time, the relay node may receive the PDCCH and the PDSCH from the base station. As relay node specific physical channels, such channels may also be referred to as an R-PDCCH (Relay-PDCCH) and an R-PDSCH (Relay-PDSCH).

Meanwhile, the R-PDSCH may perform demodulation based upon two types of reference signals, i.e., CRS or DM-RS. However, in case the base station uses an MBSFN subframe when transmitting a downlink signal to a relay base station, a CSR for demodulating the PDSCH, which is transmitted by using the transmission diversity method, does not exist in the MBSFN subframe. Therefore, it is preferable that the relay base station uses a DM-RS that is transmittable in all types of subframes, so as to demodulate the R-PDSCH.

Furthermore, if the DCI format detected after decoding the R-PDCCH corresponds to DCI format 1A, which is applied to the above-described Fallback mode, a field through which the base station can notify the relay node of the rank information does not exist in the DCI format 1A. Therefore, if DCI format 1A is detected as a result of decoding the R-PDCCH and, most particularly, a downlink grant (DL grant) that is transmitted from the $1^{st}$ slot within a single subframe, the relay node cannot know (or be aware of) the actual transmission rank of the R-PDSCH, which can be transmitted from the $2^{nd}$ slot.

When the relay node detects DCI format 1A as a decoding result of the R-PDSCH, the present invention proposes an assumption that the transmission of the R-PDSCH respective to the R-PDCCH corresponds to a single antenna port transmission having the highest reliability level. More specifically, the present invention proposes a method wherein the relay node demodulates and decodes the R-PDSCH, under the assumption that the base station is performing R-PDSCH transmission via Rank 1.

Figure 11:
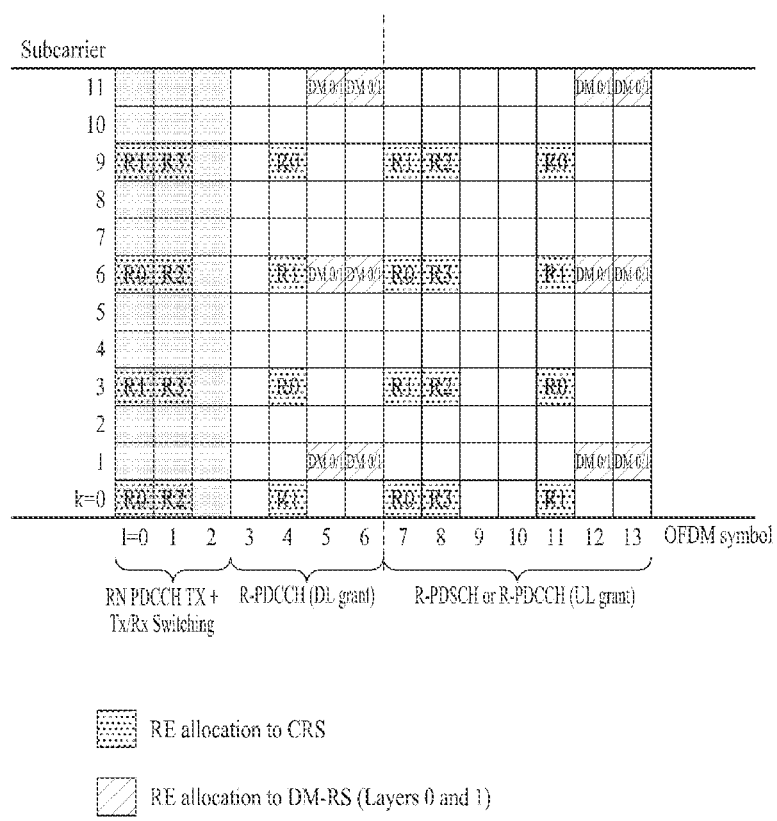
FIG. 11 illustrates an example wherein 12 resource elements for DM-RS are allocated from one resource block pair.
Figure 12:
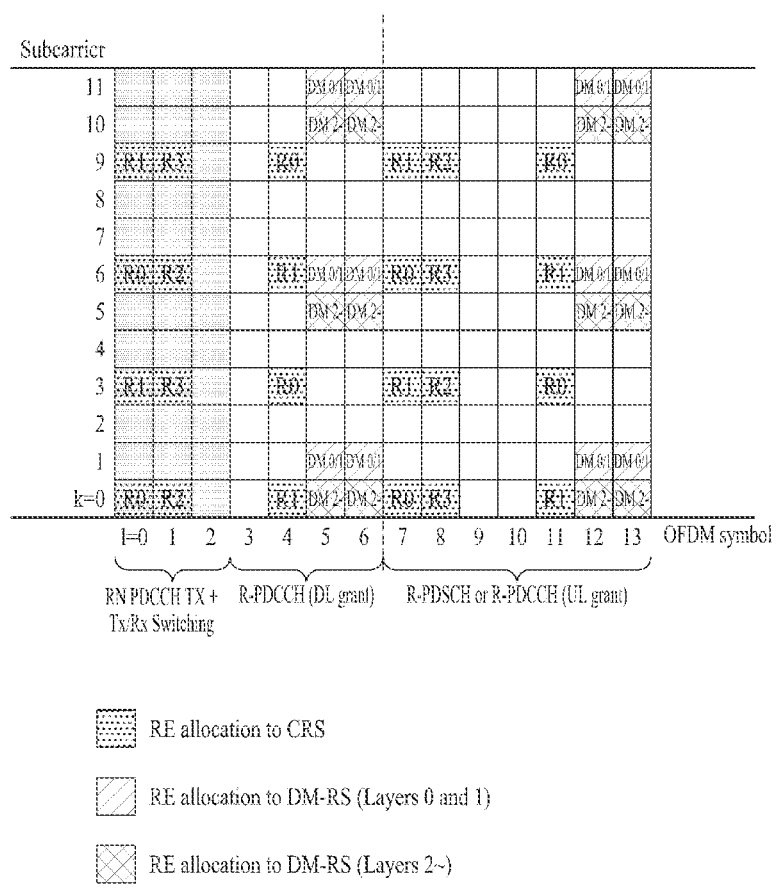
FIG. 12 illustrates an example wherein 24 resource elements for DM-RS are allocated from one resource block pair.

FIG. 11 illustrates an example wherein 12 resource elements for DM-RS are allocated from one resource block pair, and FIG. 12 illustrates an example wherein 24 resource elements for DM-RS are allocated from one resource block pair. A required number of resource elements of the DM RS may vary depending upon the actual transmission rank of the R-PDSCH. Herein, in case the Rank corresponds to Rank 1 or Rank 2, as shown in FIG. 11, 12 resource elements are required in a single resource block pair throughout the 1st slot and the 2nd slot. And, in case the Rank correspond to Rank 3 or higher, as shown in FIG. 12, 24 resource elements are required in a single resource block pair. Therefore, in order for the relay node to decode the R-PDSCH in a state where the relay node is unaware of the actual transmission rank, the relay node requires an assumption on the number of DM RS resource elements for demodulating and decoding the R-PDSCH.

In this case, according to the present invention, as a result of performing blind decoding on the R-PDCCH, if DCI format 1A designating the Fallback Mode is detected as the transmission format for the R-PDSCH, the R-PDSCH is demodulated and decoded under the assumption that the R-PDSCH is transmitted through a single antenna transmission port, i.e., always through Rank 1. Therefore, when decoding the R-PDSCH, it is preferable that 12 resource elements are allocated as the resource elements for the DM-RS, as shown in FIG. 11.

For example, even if the relay node is signaled with 2 or 4 antenna ports, as the antenna ports for the DM-RS, by a higher layer signal, the relay node detecting the DCI format 1A may demodulate and decode the R-PDSCH, under the assumption that the R-PDSCH is always transmitted through Rank 1 and that the DM-RS is allocated to 12 resource elements.

Furthermore, in case the base station transmits an R-PDCCH that can be demodulated to a DM-RS, which corresponds to a base station specific reference signal, i.e., in case the base station transmits a DM-RS based R-PDCCH to the relay node, and when the relay node detects DCI format 1A, which is applied to the Fallback mode, as the transmission format of the R-PDSCH from the R-PDCCH, the present invention proposes a method of decoding data, i.e., the R-PDSCH, by using a predetermined logical antenna port. Herein, a logical antenna port is defined as an antenna port and a scrambling ID.

More specifically, configurations may be made so that the R-PDSCH can be demodulated and decoded by using a logical antenna port, i.e., an antenna port and a scrambling ID, of the DM-RS, which is used for R-PDCCH demodulation. And, it is preferable that the logical antenna port of the DM-RS used for R-PDCCH demodulation corresponds to antenna port 7 (or 8) having a scrambling ID of 0 (or 1). This is because, in case the R-PDCCH has been successfully demodulated and decoded by using the DM-RS, it is highly likely that the logical antenna port used for R-PDCCH demodulation is processed with beamforming, so that a favorable communication can be maintained between the logical antenna port and the corresponding relay node.

Therefore, in case the relay node has decoded the DM-RS based R-PDCCH so as to detect the DCI format 1A, the relay node may decode the R-PDSCH under the assumption of performing a single antenna port transmission. However, in this case, it is preferable that the R-PDSCH is demodulated and decoded by using the logical antenna port of the DM-RS, which is used for demodulating the R-PDCCH, for example, by using antenna port 7 (or 8) having a scrambling ID of 0 (or 1).

Figure 13:
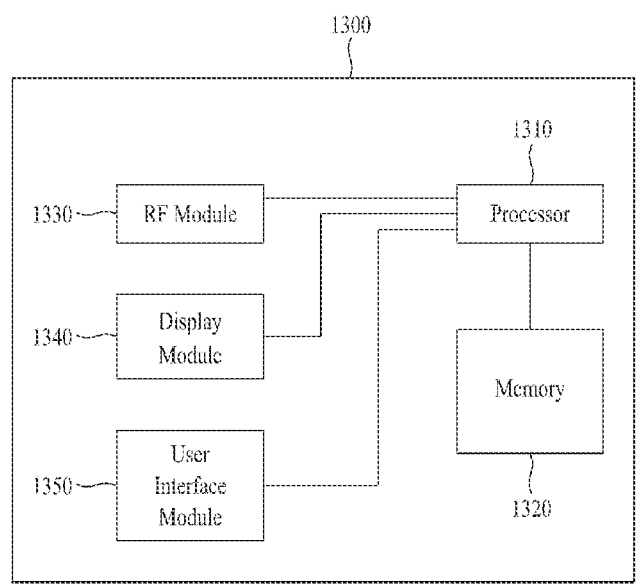
FIG. 13 illustrates a block view showing the structure of a communication apparatus according to an embodiment of the present invention.

FIG. 13 illustrates a block view showing the structure of a communication apparatus according to an embodiment of the present invention.

Referring to FIG. 13, a communication apparatus (1300) includes a processor (1310), a memory (1320), an RF module (1330), a display module (1340), and a user interface module (1350).

The communication apparatus (1300) is an exemplary illustration provided to simplify the description of the present invention. Also, the communication apparatus (1300) may further include necessary modules. Also, in the communication apparatus (1300) some of the modules may be divided into more segmented modules. Referring to FIG. 13, an example of the processor (1310) is configured to perform operations according to the embodiment of the present invention. More specifically, for the detailed operations of the processor (1310), reference may be made to the description of the present invention shown in FIG. 1 to FIG. 12.

The memory (1320) is connected to the processor (1310) and stores operating systems, applications, program codes, data, and so on. The RF module (1330) is connected to the processor (1310) and performs a function of converting baseband signals to radio (or wireless) signals or converting radio signals to baseband signals. In order to do so, the RF module (1330) performs analog conversion, amplification, filtering, and frequency uplink conversion or inverse processes of the same. The display module (1340) is connected to the processor (1310) and displays diverse information. The display module (1340) will not be limited only to the example given herein. In other words, generally known elements, such as LCD (Liquid Crystal Display), LED (Light Emitting Diode), OLED (Organic Light Emitting Diode) may also be used as the display module (1340). The user interface module (1350) is connected to the processor (1310), and the user interface module (1350) may be configured of a combination of generally known user interfaces, such as keypads, touchscreens, and so on.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In the description of the present invention, the embodiments of the present invention have been described by mainly focusing on the data transmission and reception relation between the relay node and the base station. Occasionally, in the description of the present invention, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. Herein, the term Base Station (BS) may be replaced by other terms, such as fixed station, Node B, eNode B (eNB), Access Point (AP), and so on.

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

Although the above-described a method of deciding a size of a transmission block, which is transmitted from the base station to the relay node in a wireless communication system, and apparatus thereof are described by mainly focusing on an example applied to the 3GPP LTE system, in addition to the 3GPP LTE system, the present invention may also be applied to a wider range of multiple antenna wireless communication systems.

What is claimed is:

1. A method for transmitting a physical downlink shared channel (PDSCH) to a relay node at a base station in a multiple antenna wireless communication system, the method comprising:
   modulating a relay-node-specific physical downlink control channel (R-PDCCH); and
   transmitting the R-PDCCH and the PDSCH to the relay node,
   wherein, if the R-PDCCH is modulated based on a relay-node-specific reference signal and carries a specific downlink control information, the PDSCH is transmitted based on a predetermined antenna port and a predetermined scrambling identifier (SCID).

2. The method of claim 1, wherein the relay-node-specific reference signal is a demodulation-reference signal (DM-RS).

3. The method of claim 2, wherein the predetermined antenna port is one of a plurality of antenna ports defining the DM-RS.

4. The method of claim 1, wherein the predetermined antenna port and the predetermined SCID respectively correspond to antenna port 7 and SCID 0.

5. The method of claim 1, wherein the R-PDCCH is transmitted using the predetermined antenna port and the predetermined SCID.

6. The method of claim 1, wherein the specific downlink control information is used for scheduling a PDSCH codeword.

7. The method of claim 1, wherein the specific downlink control information does not include information about a transmission rank.

8. A base station in a multiple antenna wireless communication system, the base station comprising:
   a processor configured to modulate a relay-node-specific physical downlink control channel (R-PDCCH);
   a transmitting module configured to transmit the R-PDCCH and a physical downlink shared channel (PDSCH) to a relay node,
   wherein, if the R-PDCCH is modulated based on a relay-node-specific reference signal and carries a specific downlink control information, the PDSCH is transmitted based on a predetermined antenna port and a predetermined scrambling identifier (SCID).

9. The base station of claim 8, wherein the relay-node-specific reference signal is a demodulation-reference signal (DM-RS).

10. The base station of claim 9, wherein the predetermined antenna port is one of a plurality of antenna ports defining the DM-RS.

11. The base station of claim 8, wherein the predetermined antenna port and the predetermined SCID respectively correspond to antenna port 7 and SCID 0.

12. The base station of claim 8, wherein the processor encodes transmits the R-PDCCH using the predetermined antenna port and the predetermined SCID.

13. The base station of claim 8, wherein the specific downlink control information is used for scheduling a PDSCH codeword.

14. The base station of claim 8, wherein the specific downlink control information does not include information about a transmission rank.

15. A method for receiving a downlink physical shared channel (PDSCH) from a base station at a relay node in a multiple antenna wireless communication system, the method comprising:

receiving a relay-node-specific downlink physical control channel (R-PDCCH) from the base station; and receiving the PDSCH based on a predetermined antenna port and a predetermined scrambling identifier (SCID), if the R-PDCCH is demodulated based on a relay-node-specific reference signal and a specific downlink information is detected from the R-PDCCH.

16. The method of claim 15, wherein the relay-node-specific reference signal is a Demodulation-Reference Signal (DM-RS).

17. The method of claim 16, wherein the predetermined antenna port is one of antenna ports defining the DM-RS.

18. The method of claim 15, wherein the predetermined antenna port and the predetermined scrambling ID respectively correspond to antenna port 7 and scrambling ID 0.

19. The method of claim 15, wherein the R-PDCCH is received using the predetermined antenna port and the predetermined SCID.

20. The method of claim 15, wherein the specific downlink control information is used for scheduling of one PDSCH codeword.

21. A relay node in a multiple antenna wireless communication system, the relay node comprising:

a receiving mode for receiving a relay-node-specific downlink physical control channel (R-PDCCH) and a downlink physical shared channel (PDSCH) from a base station; and a processor for demodulating the R-PDCCH based on a relay-node-specific reference signal, wherein the PDSCH is received based on a predetermined antenna port and a predetermined scrambling identifier (SCID), if the R-PDCCH is demodulated based on a relay-node-specific reference signal and a specific downlink information is detected from the R-PDCCH.

22. The relay node of claim 21, wherein the relay-node-specific reference signal is a Demodulation-Reference Signal (DM-RS).

23. The relay node of claim 22, wherein the predetermined antenna port is one of antenna ports defining the DM-RS.

24. The relay node of claim 21, wherein the predetermined antenna port and the predetermined scrambling ID respectively correspond to antenna port 7 and scrambling ID 0.

25. The relay node of claim 21, wherein the R-PDCCH is received using the predetermined antenna port and the predetermined SCID.

26. The relay node of claim 21, wherein the specific downlink control information is used for scheduling of one PDSCH codeword.

* * * * *